UNITED STATES PATENT OFFICE.

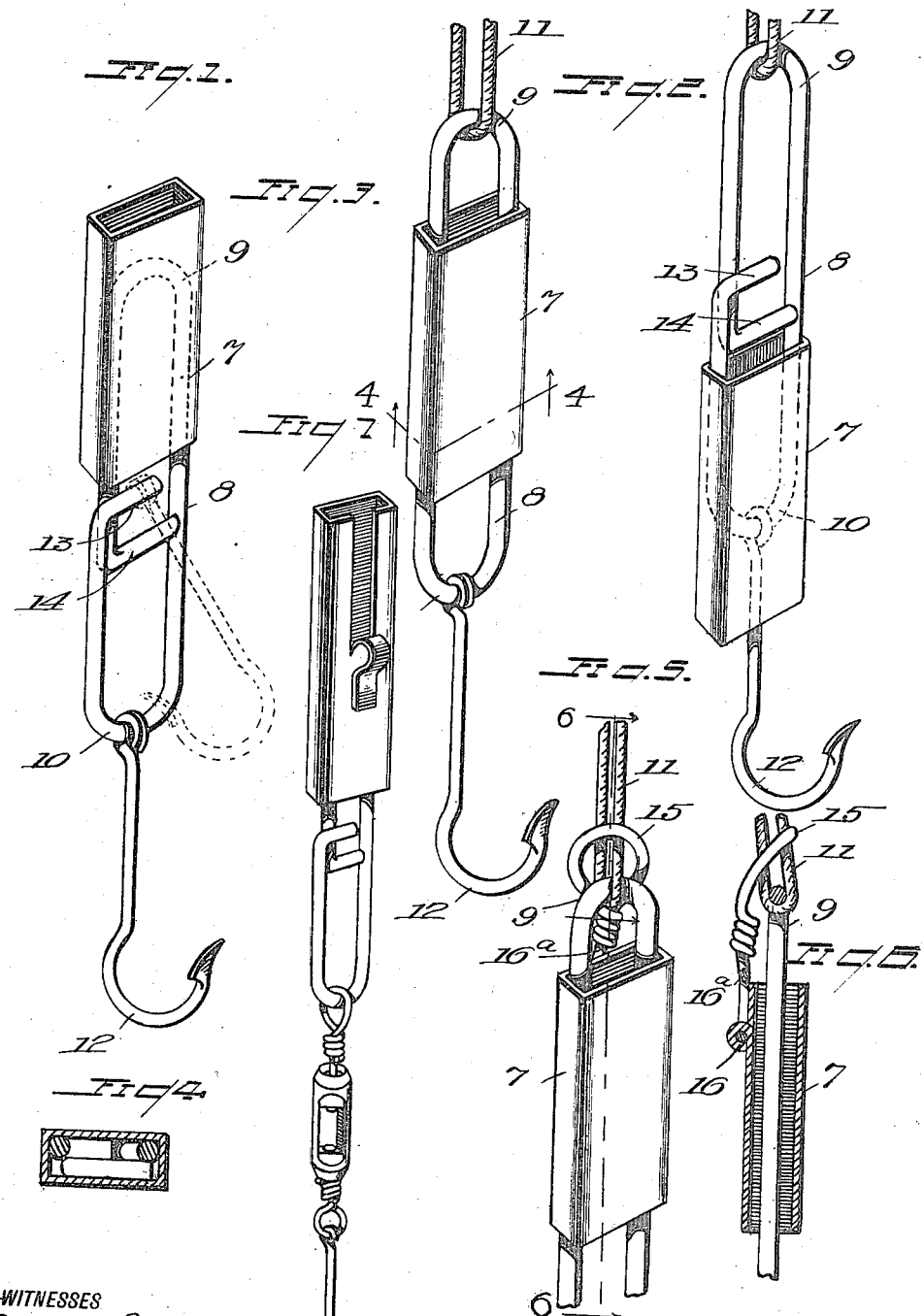

JULIUS JOHANSEN, OF BRAINERD, MINNESOTA.

FISH-HOOK ATTACHMENT.

1,249,104.  Specification of Letters Patent.  Patented Dec. 4, 1917.

Application filed May 19, 1917. Serial No. 169,805.

*To all whom it may concern:*

Be it known that I, JULIUS JOHANSEN, a citizen of the United States, and a resident of Brainerd, in the county of Crow Wing and State of Minnesota, have invented a new and useful Improvement in Fish-Hook Attachments, of which the following is a specification.

My invention relates to fishhooks and more particularly to means for attaching a fishhook attachment to a snell, leader, line or the like.

An important object of my invention is to provide a device of this character which may be securely attached to a fishing line or the like and when attached may be easily and quickly operated to change hooks or may be entirely detached as desired.

A further object is to provide a device of simple and durable construction but highly efficient and inexpesive to manufacture.

Other objects and advantages will become more apparent as the description proceeds and reference is had to the accompanying drawings, forming part of this specification, wherein, Figure 1 is a perspective view of an embodiment of my invention, showing the parts arranged to receive the fishhook, Fig. 2 is a perspective view showing the parts arranged to receive the line, Fig. 3 is a perspective view showing the device ready for use, Fig. 4 is a cross sectional view on line 4—4 of Fig. 3, Fig. 5 is a perspective view of a preferred embodiment of my invention, Fig. 6 is a vertical longitudinal section on line 6—6 of Fig. 5, Fig. 7 is a perspective view showing a swivel interposed between the link member and the hook.

Referring to the drawings it will be seen my invention comprises a housing 7 of sheet metal or the like having slidably mounted therein a link member 8. The link member is preferably one-piece resilient wire forming upper and lower loops 9 and 10 for attaching to the line 11 and suspending the hook 12 respectively. The ends of the wire bear upon one another in longitudinally and laterally overlapping relation for a short distance, approximately midway the length of the link member, the ends being bent inwardly substantially at right angles to extend transversely to the opposite side of the link, as shown at 13 and 14.

Due to this overlapping relation and to the inturned ends 13 and 14 the link member is normally closed and when inserted in the housing in the position shown in Figs. 3 and 5 is effectually locked in closed position.

However, it is to be noted that when the link member is removed from the housing, as shown in Fig. 1 or 2, the overlapping portions may be readily sprung apart to allow the hook or the line to be snapped into proper position.

As above stated, the link member is preferably made of resilient wire and frictionally contacts with the interior walls of the housing being thereby maintained in proper position or relation with respect to the housing. To positively insure the proper relation of the link member to the housing, a loop or eye 15 is provided (see Figs. 5 and 6) which is secured to the housing as shown at 16. This eye 15 may be secured to the housing in any suitable manner but preferably is at one end of a short rod $16^a$ pivoted at its other end to the housing. The fishing line 11 which is attached to the upper loop of the link member passes through the eye 15 thereby limiting the movement of the link member with respect to the housing and maintaining the proper relation between the two.

In practice the link member is withdrawn from the housing as shown in Fig. 1 and the hook 12 is slipped on the inturned end 13 and snapped over the overlapping portion to its suspended position from the lower loop. The link member is then moved to the position shown in Fig. 2 and the line likewise attached to the upper loop. The link member is finally moved to the position shown in Figs. 3 and 6, locking the device and positively preventing accidental disengagement of the hook or line or any of the parts.

When desired a swivel may be interposed between the link member and the hook illustrated in Fig. 7. It is obvious that the swivel may be interposed between the link member and line if this arrangement should be more desirable.

I claim:—

1. A device for attaching a fishhook to a line or the like comprising a housing open at both ends and flattened transversely with flat sides for engaging the sides of a link rod, a link member slidably mounted in said housing and frictionally contacting with the interior walls thereof, said link member having upper and lower loops for attaching the device to the line and suspending the hook respectively and having its separated ends longitudinally and laterally overlapping approximately midway the length of the link and bent substantially at right angles to extend transversely to the opposite side of the link, whereby the link is normally closed by the overlapping portions of the separated ends and is locked in said closed position when contained within the housing, and an eye pivoted to said housing and coöperating with a line attached to the upper loop of the link member to normally maintain the link member within the housing.

2. A device for attaching a fishhook to a line or the like comprising a housing, a link member slidably mounted in said housing and frictionally contacting with the walls thereof, said link member having upper and lower loops for attaching the device to the line and suspending the hook respectively, and having its separated ends overlapping and bent substantially at right angles to extend transversely to the opposite side of the link whereby the link is normally closed and is locked in said closed position when contained within the housing and means for maintaining the link within the housing.

3. A device for attaching a fishhook to a line or the like comprising a housing, a link member slidably mounted in said housing and frictionally contacting with the interior walls thereof, said link member having upper and lower loops for attaching the device to the line and suspending the hook respectively and having its separated ends overlapping longitudinally and laterally with respect to the length of the link whereby the link is normally closed and is locked in said closed position when inserted within the housing.

4. A device for attaching a fishhook to a line or the like comprising a housing, a link member slidably mounted in said housing, said link member having upper and lower loops for attaching the device to the fishing line and suspending the hook respectively and means secured to the housing and engaging the line for maintaining the link member and the housing in proper relation.

5. A device for attaching a fish hook to a line or the like, comprising a housing, a link member slidably mounted in said housing and frictionally contacting with the interior walls thereof, said link member having upper and lower loops for attaching the device to the line and suspending the hook respectively and having its separated ends overlapping longitudinally and laterally with respect to the length of the link, whereby the link is normally closed and locked in said closed position when inserted within the housing, a rod pivoted to the housing and an eye formed at the outer end of the rod for engaging the line and limiting the movement of the link member with respect to the housing, thereby maintaining the proper relation between the two.

JULIUS JOHANSEN.

Witnesses:
 OLE BLACKSTAD,
 BERTRAM M. BLACKSTAD.

Copies of this patent may be obtained for five cents each, by addressing the "Commissioner of Patents, Washington, D. C."